Patented Feb. 6, 1951

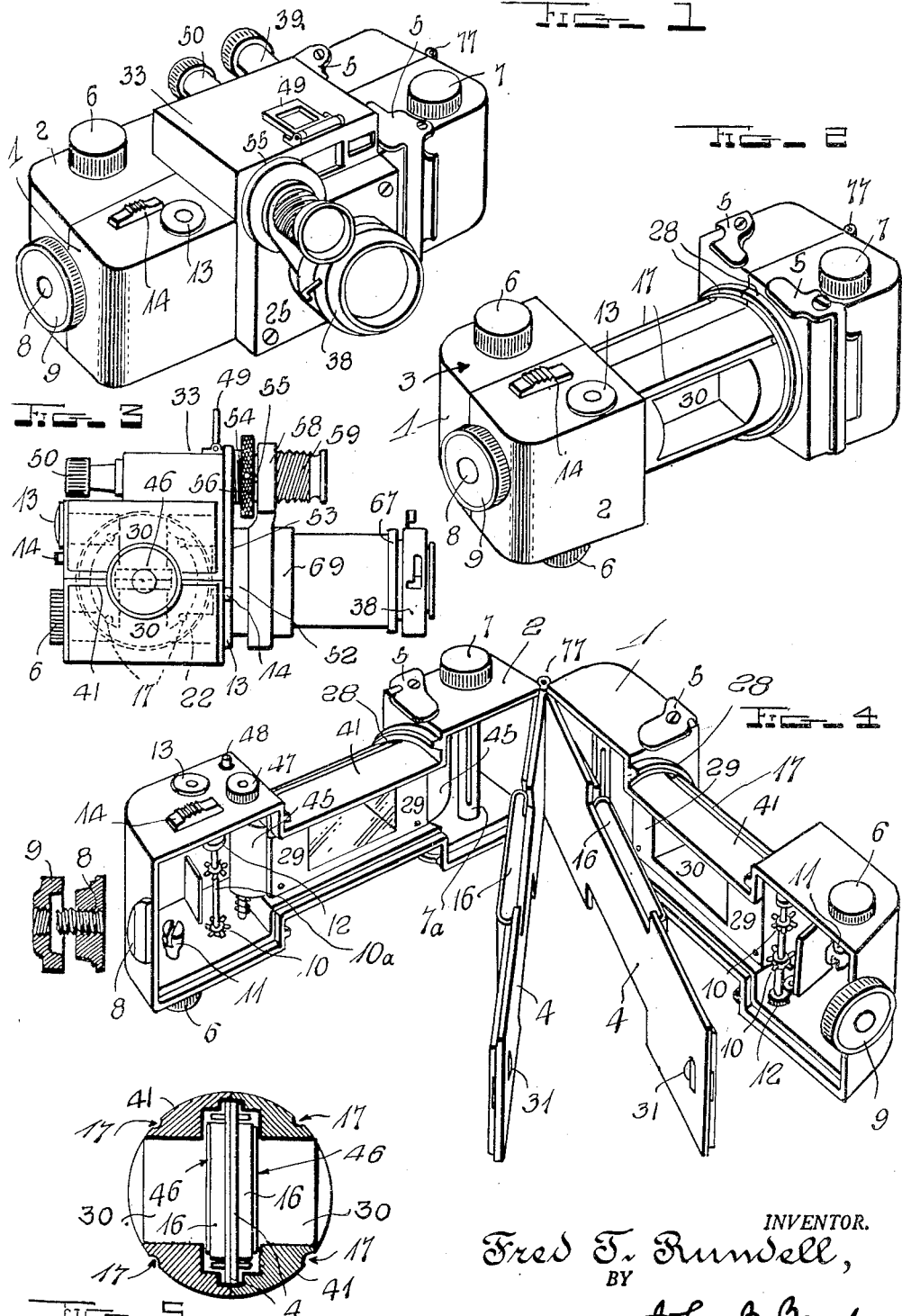

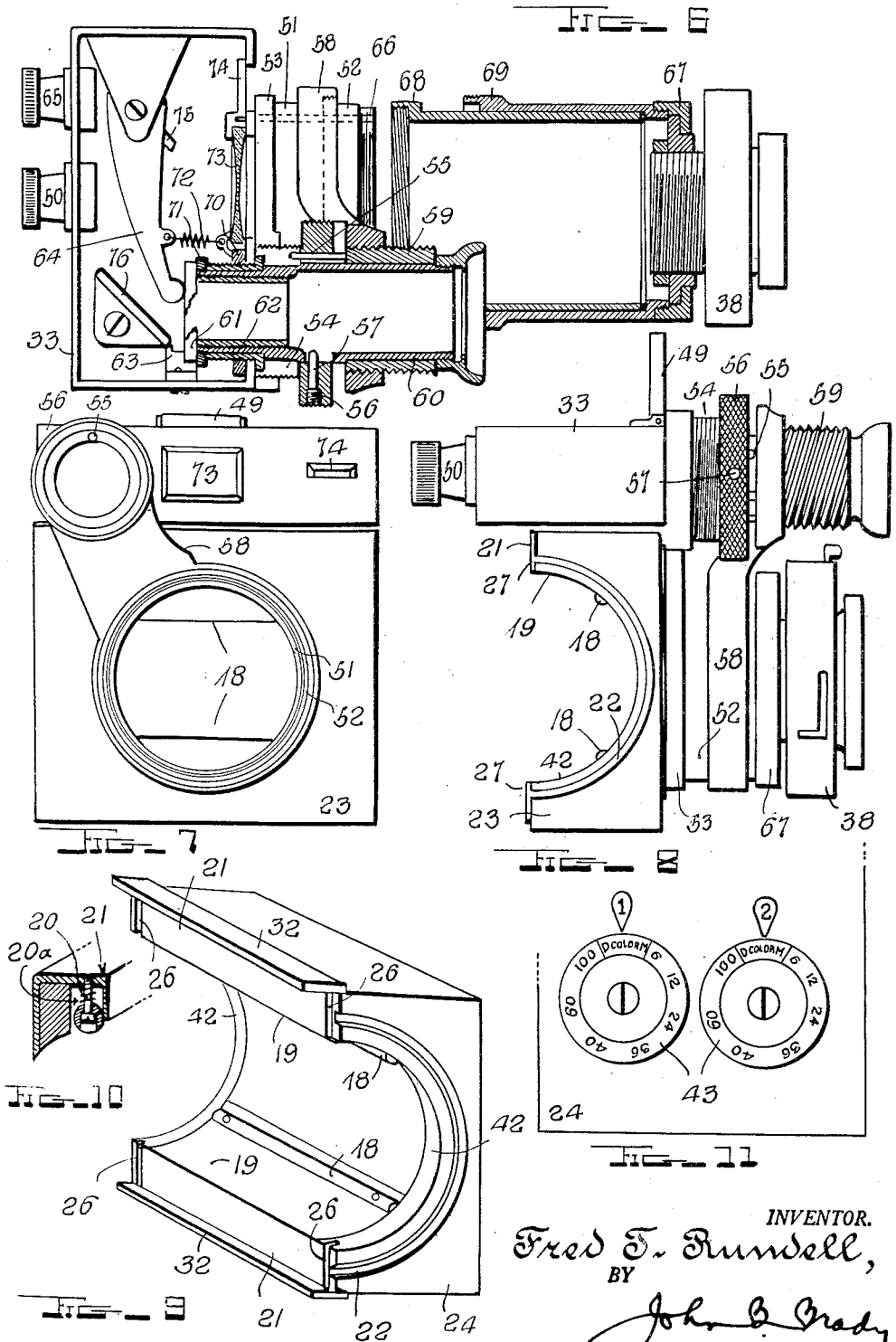

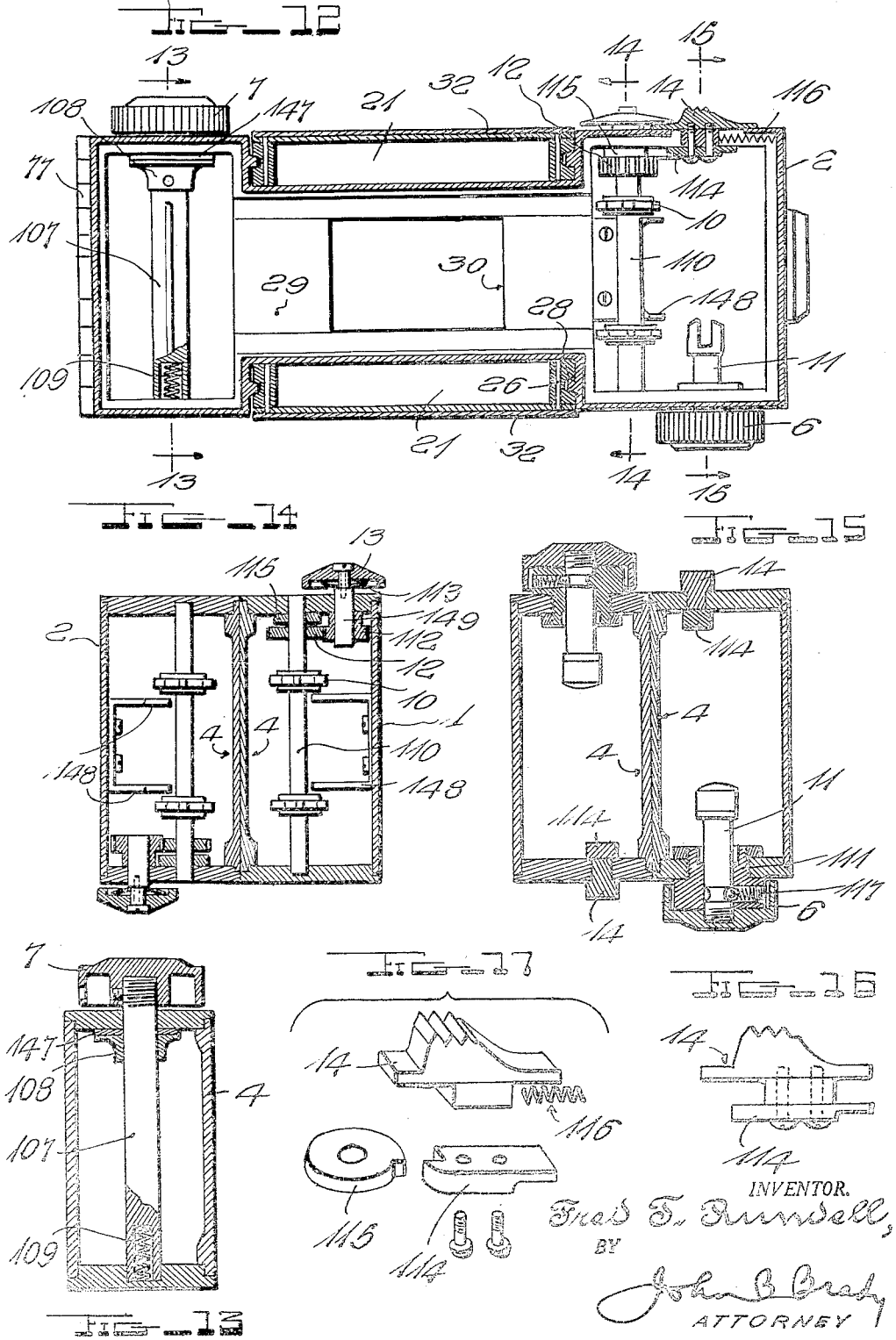

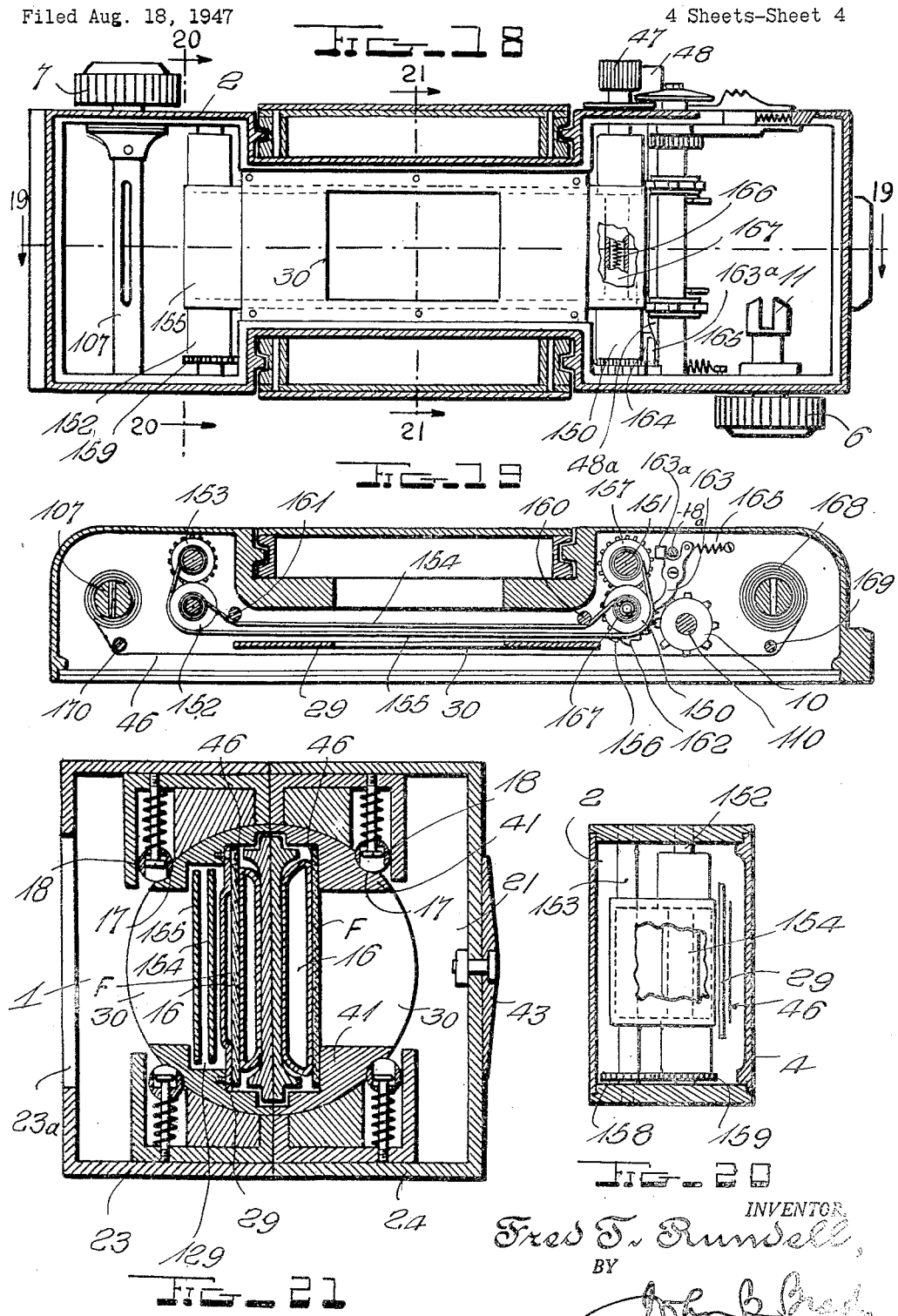

2,540,351

UNITED STATES PATENT OFFICE 2,540,351

TWO-FILM CAMERA HAVING PIVOTED BODY SECTIONS

Fred T. Rundell, Morgantown, W. Va.

Application August 18, 1947, Serial No. 769,231

12 Claims. (Cl. 95—11)

My invention relates broadly to photography and more particularly to a construction of multiple film camera for photography requiring films of two differing characteristics, such as differing degrees of photographic sensitivity or color and black and white.

One of the objects of my invention is to provide an improved construction of multiple film camera operative to carry film of differing characteristics for selective exposure in the taking of pictures under different conditions.

Another object of my invention is to provide a construction of multiple film camera consisting of a twin rotor selectively revolvable within a camera housing which carries a lens system with which the rotor within the housing may be selectively aligned for effecting selected exposures.

Another object of my invention is to provide a twin rotor camera having means for selectively aligning the twin rotor with a lens system carried by a light tight housing surrounding the rotor within which the rotor is selectively revolvable.

Another object of my invention is to provide a construction of twin rotor camera comprising a pair of camera sections each carrying an adjustable film system and which are revolvable within a housing carrying a lens system with means interconnecting the twin rotor and the housing for aligning the lens system with the film in either of the twin sections of the camera.

A still further object of my invention is to provide an improved range finder mechanism for cameras.

Still another object of my invention is to provide an improved telephoto means attachment for cameras.

Still another object of my invention is to provide an improved construction of focal plane shutter for cameras.

Other and further objects of my invention reside in the construction of twin rotor camera as set forth more fully in the specification hereinafter following by reference to the accompanying drawings in which:

Figure 1 is a perspective view of the twin rotor camera of my invention with the lens housing in position equipped with a standard lens system; Fig. 2 is a perspective view of the twin rotor camera illustrating the lens housing removed from the camera; Fig. 3 is an end view of the twin rotor camera with the lens housing in position and showing a telephoto lens substituted for the standard lens of Fig. 1, and mounted in position; Fig. 4 is a perspective view of the twin rotor camera with the two sections thereof illustrated in open position and with the light tight covers swung to open position; Fig. 5 is a transverse sectional view taken through the twin rotor at its narrowest transverse position; Fig. 6 is a horizontal sectional view taken through the upper portion of the housing which carries the lens system and showing one arrangement for mounting the lens system including the telephoto lens attachment, certain of the parts being illustrated in elevation; Fig. 7 is a front view of the housing illustrated in Fig. 6; Fig. 8 is a side elevational view of one of the half sections of the housing and showing the mounting thereon of the lens system; Fig. 9 is a perspective view of one of the half sections of the housing, the view showing the half section which is opposite to the half section illustrated in Fig. 8; Fig. 10 is a fragmentary perspective view illustrating one of the light-proofing means employed in the camera construction and showing one form of spring-actuated latch which I may employ for lining the lens housing with the twin rotor camera; Fig. 11 is a rear view of the housing section illustrated in Fig. 9 and showing the arrangement thereon of the calibration means for providing instructive data for informing the operator with respect to the characteristics of the film carried in each side of the twin rotor camera; Fig. 12 is a vertical sectional view taken through one of the rotor sections of the camera with certain of the parts illustrated in elevation; Fig. 13 is a vertical sectional view taken substantially on line 13—13 of Fig. 12; Fig. 14 is a vertical sectional view taken substantially on line 14—14 of Fig. 12, the view illustrating both sections of the rotor in position adjacent to each other; Fig. 15 is a vertical sectional view taken substantially on line 15—15 of Fig. 12, the view showing both sections of the rotor extending adjacent each other; Fig. 16 is a side elevational view of the latch mechanism for advancing the film one frame at a time; Fig. 17 is a perspective view of the components of the latch mechanism shown in superimposed relation; Fig. 18 is a vertical sectional view through one of the camera sections of the twin rotor and illustrating the addition of a focal plane shutter to the structure of my invention; Fig. 19 is a horizontal sectional view taken on line 19—19 of Fig. 18; Fig. 20 is a vertical sectional view taken substantially on line 20—20 of Fig. 19; Fig. 21 is a vertical sectional view taken substantially on line 21—21 of Fig. 18 and illustrating in cross section the focal plane shutter employed in the construction.

My invention is illustrated as applied to 35 mm. cameras, but it will be understood that my invention is equally applicable to cameras employing films of other sizes. The camera of my invention has the advantage of carrying a black and white, and a color film at the same time. Or, the camera of my invention may carry any combination of film and/or ground glass and one film for close-up work. Either type of film can be placed into position for operation by the simple half turn of the twin rotor.

The camera of my invention takes the place of two cameras for those wanting to carry two different types of film. Either side of rotor can be opened and the film removed and replaced without interference to the other side. The camera can be loaded or unloaded just as simply as a single film camera is loaded and unloaded, as each side has the necessary cartridge holder, with winding and counting devices to make each side comprise a complete unit within itself, with the two systems coacting as a unitary camera.

Referring to the drawings reference characters 1 and 2 designate two camera sections which combine to form a complete camera unit 3. This unit becomes the rotor film holders when placed in housing sections 23 and 24 and turns forward or backward to place the film in position to expose the image.

Housing sections 23 and 24 are placed on the rotor when the rotor is open on hinge 77, as shown in Fig. 4. The semi-circular ring portions 22 are so lined up with semi-circular ring portions 28 on opposite ends of housing sections 23 and 24 that the complete assembly is held together and free to turn when unit 3 is closed and locked by fastening means formed by the thumb screw constituting cylindrical cup shaped end member 8 and the screw fastener 9, which is attached one-half on section 1 and one-half on section 2, when sections 1 and 2 are moved to a position adjacent each other. Fastener 8 is split, one-half holding the projecting screw for member 9 which may be screwed on to fastener 8 and the other half without the attachment screw but forming a complete frusto-conical surface, so that when member 9 is screwed home over the two parts of fastener 8 the camera sections 1 and 2 align and lock the assembly firmly together. Reference characters 26 and 19 designate the light-proofing and dust-proofing parts.

Tongues 27 extend into the grooves 26 in housing 24 to shut off light when sections 1 and 2 of camera unit 3 is closed and locked. Reference character 19 designates felt inserted in light tight housing 21. The light tight housing 21 also carries light-proofing members 18 that float and are held in place by pins 20 and ejection springs 20a. The light-proofing members 18 resiliently engage longitudinally extending slots 17 when the rotor is turned. This always aligns film carried by camera sections 1 and 2 in focal plane position for each exposure. Slots 17 are equally spaced top and bottom and this permits on each half turn all four light-proofing members 18 to be displaced and seat back in place causing this alignment.

Then the pivotally mounted latching means 5 one on each of the sections 1 and 2 are moved into place by swinging them out from the rotor to unlatch and pressing them in tight to lock the housing in position. The latching means 5 are in the form of bands that embrace the housing and assure alignment of the optical system with the film in the camera sections 1 and 2.

Reference character 29 designates the film track in each of the sections 1 and 2 which guide the film shown at F. Reference character 30 designates the opening or aperture for exposure through the front side. A film cartridge is placed on film actuator 11 and film drawn over sprocket teeth 10 on shaft 10a with the light sensitive emulsion side down against film guide 29 and aperture 30. The end of the film F is anchored in slotted shaft 7a to which actuating knob 7 is attached.

Each camera section 1 and 2 is closed by a cover plate 4 shaped to prevent leakage of light from either section of the camera and having a pressure shoe 16 attached thereto and yieldably supported to hold the film F firmly down on the track 29. The cover plates extending over camera sections 1 and 2 may be closed and locked with respect thereto by means of latch member 31 which engages the associated camera section. This completes one rotor holder half or section 1. Section 2 is arranged in the same manner and both sections 1 and 2 are closed and lock by means of screw device 9.

Gear member 12 carried on shaft 10a is connected through suitable gearing with counting device 13 in such manner as to cause each frame to be counted as the film is exposed. Slide 14 is actuated each time that it is desired to unlock the counter device 13 when knob 7 is moved to roll shaft 7a to the next frame. Calibrated dials 43 are mounted on the rear of housing 24 and Weston ratings and can be set accordingly as an indicator for the type of film in each separate compartment of rotor section 1 or section 2 viewed from the exterior of the housing when the film is in place ready for exposure. Actuating knob 6 is used to wind the film back into the cartridge before removal. When camera unit 3 and camera housing sections 23, 24 all are assembled and closed, elements 26, 27 and 32 complete the light-proofing, so when the rotor is turned the film in either side of the camera unit will not be light struck.

As in Fig. 3 when film is in the half-way position, or 90°, the camera cannot be opened, therefore danger of spoiling film is prevented. In this position the lens tube and objective lenses, of different focal lengths, can be changed without danger to the film. Camera sections 1 and 2 complete the camera unit including the cylindrical portion of reduced section indicated at 41 arranged so that housing 23—24 turns on trackways 42 therearound. The cylindrical portion 41 has the slots 17 so spaced that when the rotor is turned 90° all lightproofing members 18 drop in these slots 17. Also members 5 are used to lock the rotor in this position and secure the whole assembly in alignment. It will be observed that the outside contour of camera sections 1 and 2 and housing sections 23—24 are square so that member 5 will lock from either side and cannot be opened until member 5 is again released. In this position film 46 is disposed over 30 and all light that hits film 46 has to pass through apertures 30 from the objective side. When the rotor is in 90° position as indicated in Fig. 3, aperture 30 is 90° from the objective, and so is completely sealed off.

In Fig. 4 I have shown camera sections 1 and 2 hinged by pintle 77, but in open position, each side showing the interior of the camera. In Fig. 4 I have shown how one side of rotor section 1 may have a focal plane shutter installed for high speed work, as this shutter can be operated up to about 1000th second. The focal plane shutter arrangement is shown more clearly in Figs. 18-20. Reference character 45 designates the shutter and is wound up and timed by control knob 47. When the focal shutter 45 is set it may be released by member 48. The release 48 may be installed in the side of section 1 and section 2, as shown in Figs. 2 and 3. In this case the blade type shutter 38 is not used. My camera may be equipped with either the blade type or the focal plane type of shutter.

In Fig. 6 I have shown at 33 the case or housing for the range finder and viewfinder. Reference character 62 designates a bushing held in place in case 33 by nut 70. The binding forms a bearing for sleeve 60 which is the control and foundation for the balance of assembly. Sleeve 60 is so designed that each part 54, 56, 59, has its own surface to ride on and cannot get out of this space. Part 54 with part 53 is attached by a helix and in turn attached to part 52 and slides on sleeve 51. The part 52 has a threaded end. The slidable tubular member 69 is adjustable with respect to tubular member 66. Member 67 forms a support for the adjustable lens carrier which includes a standard lens of, for example, two inch focal length and the shutter 38. Reference character 59 designates a helix which coacts with helix 54. Helixes 59 and 54 are free and independent of each other but helix 54 is connected by member 56 to helix 54. When member 56 is pushed to the left and pin 55 engages in helix 54, pin 57 passes through member 56 and drives inner sleeve 60. Reference character 61 designates a threaded sleeve. The threaded sleeve 61 is drilled straight through so that the image can be located on prism 76. As member 56 is revolved it also turns inner sleeve 60 causing member 53 and threaded sleeve 61 to be synchronized. Guide member 63 is so placed in a slot in threaded sleeve 61 that it prevents threaded sleeve 61 from revolving; and, therefore, moves pivoted lever 64 which in turn moves prism 75. This lines up the image on prisms 76 and 75 and finds the range.

When a long focal length or telephoto lens is used the telephoto screen 49 is dropped down over the front of viewfinder 73, for modifying the field of the viewfinder by the field of the telephoto lens shown in Fig. 6. For certain pictures member 68 may be removed from threaded terminus 66 and member 67 directly connected to threaded terminus 66 thus converting the camera from telephoto operation to standard operation. Then in turn, tubular member 69 screws into the internally threaded portion 58. This in turn lines up and connects to helix 59. Member 56 is rotated to the left as far as it will go and then slides to the right. Pin 55 disengages from helix 54 and engages with helix 59. The arrangement of movement of sleeve 60 to threaded sleeve 61 is now the same as for the short focal length lens. Thus, the one range finder takes care of both short and long focal length lenses. During this change over from short to long or long to short, focal length lenses, rotor 3 is moved to the position as shown in Fig. 3, as before stated.

The film is advanced from the cartridge that is installed on film actuator 11 and the end of film attached to actuator 107 by sliding detent 14 back away from cam 115. This action disengages the latch formed by detent 14 and cam 115 is then free to revolve. By turning actuator 107 until detent 14 which is spring pressed by spring 116 the film may be advanced one frame. Each successive operation of detent 14 counts off one frame since the perforated edges of the film have to pass over sprockets 10. This causes shaft 110 to drive gear 12 which meshes with gear 112 carried by shaft 149. Shaft 149 drives counting device 13 through spring tension 113.

In Figs. 18-20 I have shown the camera of my invention equipped with the focal plane shutter curtains 154 (front) and 155 (rear). I show how the same camera rotor part can have a focal plane shutter installed by making center portion shorter and each end of film compartments longer to accommodate the rear rollers 150 and 152 and the front rollers 151 and 153. The camera sections 1 and 2 contain the shutter curtains 154 and 155. The shutter curtain 154 is the front curtain and is carried by front rollers 151 and 153. The rear shutter curtain 155 is carried by rear rollers 150 and 152. The front and rear curtains 154 and 155 contain apertures which may be aligned with each other in the optical path of the aperture 30 in effecting an exposure. The rollers 150 and 151 are synchronized by intermeshing gears 156 and 157. The rollers 152 and 153 are synchronized by intermeshed gears 158 and 159 which are shown more clearly in Fig. 20. Fig. 20 also represents the manner in which the gear curtain 155 extends transversely across the front curtain 154.

I provide guide rollers 160 and 161 for guiding the front curtain 154. A ratchet 162 is provided for rear roller 150 with a coacting ratchet pawl 163 associated therewith. A lever 164 connects to the actuator 48 external to the camera for the purpose of tripping the pawl 163 for effecting an operation of the focal plane shutter. A pawl spring 165 is provided for controlling the movement of pawl 163.

The focal plane shutters constituted by front curtain 154 and rear curtain 155 are caused to move under action of the torsion spring drive represented by coil spring 166 located within the hollow tube 167 forming part of the rear roller 150. By winding control knob 47 coil spring 166 is torsionally wound and maintained in said wound condition through the cooperation of ratchet 162 and ratchet pawl 163. Upon actuation of release 48 a quick movement of the curtains 154 and 155 is effected for making an exposure.

Track 29 covers opening 129 in rotor 41 to allow front and rear curtains 154 and 155 to pass back and forth across opening 30. In Fig. 21 I have shown on the left of the housing side section 23 the lens mounting aperture 23a for mounting the lens system shown in Fig. 8.

To operate the focal plane shutter control knob 47 is wound to the proper tension to set the shutter by winding spring 166. Actuator 48 having rod-like extension 48a with a cam-like or tapered end thereon is depressed to displace upstanding pin 163a attached to release pawl 163 to effect movement of the release pawl 163 against the action of spring 165 for disengaging the pawl from ratchet 162. Spring means are provided to immediately restore actuator 48 to a position in which pin 163a and pawl 163 return to normal position and pawl 163 engages ratchet 165 for arresting movement of the focal plane shutter. The opening 129 is made quite deep to make it possible to use the focal plane type shutter as shown in Fig. 21 as compared with a much shallower opening when employing the blade type shutter 38 indicated in Figs. 1 and 3.

In Fig. 13 I have shown shaft member 107 recessed at one end for receiving coil spring 109 installed on the inside end of shaft 107. This spring 109 when wound by movement of shaft 107 under the pull exerted by the film which connects therewith puts torsion on shaft member 107. Bushing 108 is fastened to shaft 107 and in turn forces disc member 147 into frictional relation with the inside wall of camera section 2 and acts as a friction brake for stabilizing movement of the film as it exerts a pull on shaft 107.

Fig. 20 shows the portion of rollers 152 and 153 on section line 20—20 behind shaft 107. This is the curtain 154—155 that is arranged in the film compartment end that contains the shutter release mechanism controlled by actuator 48. The film cartridge is shown mounted at 168 on actuator 11 with the film 46 passing around guides 169 and 170 to the winding shaft 107 as heretofore explained.

The sections 1 and 2 of the camera when closed upon themselves and prior to the application of the housings 23 and 24 thereto present a most novel contour so far as a camera is concerned. The contour of the camera sections when closed upon themselves somewhat resembles the shape of an exerciser or dumb-bell. When, however, the housings 23 and 24 are added a substantially polygonal contour is imparted to the camera casing. The rotor is adapted to revolve within the housings 23 and 24 in moving the camera sections to a selected station with respect to the optical system.

Fig. 21 shows the manner in which the rotor 141 is revolved within the housing sections 23 and 24 in the manner in which the rotor is brought to rest and locked at the station fixed by the entry of light-proofing members 18 into slots 17.

While I have described the camera of my invention in certain of its preferred embodiments I realize that modifications in construction and arrangement may be made and I desire that it be understood that no limitations upon my invention are intended other than may be imposed by the scope of the appended claims.

What I claim as new and desire to secure by Letters Patent of the United States is as follows:

1. A camera of the dual type comprising a pair of camera sections hingedly connected at adjacent ends thereof and adapted to be transversely separated with respect to each other, each of said sections enclosing a film, a film moving mechanism, a shutter, an optical aperture system carried by each of said camera sections, and an optical lens housing carrying an optical lens system, said housing surrounding said camera sections, said camera sections being rotatable within said optical lens housing for presenting the optical aperture system of either of said sections selectively in alignment with the optical lens system carried by said optical lens housing, said camera sections when closed back-to-back having conjointly a circular cross-section with said films enclosed by said sections extending in substantially parallel spaced planes, the axis of rotation of said camera sections being coincident with the axis of said lens housing.

2. A twin camera comprising a pair of longitudinally extending camera sections hingedly connected together at adjacent ends thereof and adapted to swing open and close about the hinged connection thereof as a center, each of said sections including a light sensitive film system, a film moving mechanism and a light aperture, light-proofing closure means for each of said camera sections, a housing surrounding said camera sections, an optical system carried by said housing, and transversely disposed annular means extending between each of said camera sections and said housing for guiding the optical apertures of said camera sections into selective alignment with the lens system carried by said housing, said camera sections when closed back-to-back having conjointly a circular cross-section with said films disposed within the lightproofing closure means extending in substantially parallel planes, the axis of rotation of said camera sections being coincident with the axis of said housing.

3. A twin film camera comprising a pair of camera sections each including a light sensitive film, a film moving mechanism, a light aperture, a lightproofing closure, means pivotally connecting said camera sections with respect to each other at adjacent ends thereof whereby said sections may swing to open or closed position with respect to each other about the pivotally connecting means, means interlocking said camera sections in adjacent relation, a housing surrounding said camera sections, a lens system carried by said housing, and annular means projecting from said camera sections and into said housing for guiding said camera sections in angular positions within said housing for selectively aligning the optical aperture of either of said camera sections with said lens system in said housing, said camera sections when closed back-to-back having conjointly a circular cross-section with said films disposed within the lightproofing closure extending in substantially parallel separated planes, the axis of rotation of said camera sections being coincident with the axis of said housing.

4. A twin film camera comprising a pair of camera sections each including a light sensitive film, a film moving mechanism, a light aperture, a lightproofing closure, means pivotally mounting said camera sections with respect to each other at adjacent ends thereof whereby said sections may swing to open or closed position with respect to each other about the pivotally connecting means, means interlocking said camera sections in closed position for annular movement as a unit, a housing surrounding said camera sections, a lens system carried by said housing, annular means projecting from said camera sections and into said housing for guiding said camera sections in angular positions for selectively aligning the optical aperture of either of said camera sections with said lens system in said housing, and means carried by said camera sections and slidable over said housing for maintaining said housing in a selectively aligned position with respect to said light apertures, said camera sections when closed back-to-back having conjointly a circular cross-section with said films disposed within the lightproofing closure extending in substantially parallel separated planes, the axis of rotation of said camera sections being coincident with the axis of said housing.

5. A twin film camera comprising a pair of camera sections each including a light sensitive film, a film moving mechanism, a light aperture, a lightproofing closure, means pivotally mounting said camera sections with respect to each other at adjacent ends thereof whereby said sections may swing to open or closed position with respect to each other about the pivotally connecting means, means interlocking said camera sections in closed position for annular movement as a unit, a housing surrounding said camera sections, a lens system carried by said housing, annular means projecting from said camera sections and into said housing for guiding said camera sections in angular positions for selectively aligning the optical aperture of either of said camera sections with said lens system in said housing, and latching means comprising band members pivotally mounted on said camera sections and angularly movable to a position extending over said housing for maintaining said housing in a predetermined selectively aligned position with respect to said camera sections when closed as a unit, said camera sections when closed back-to-back having conjointly a circular cross-section with said films disposed within the lightproofing closure extending in substantially parallel separated planes, the axis of rotation of said camera sections being coincident with the axis of said housing.

6. A twin film camera comprising a pair of camera sections each including a light sensitive film, a film moving mechanism, a light aperture, a lightproofing closure, means pivotally mounting said camera sections with respect to each other at adjacent ends thereof, means interlocking said camera sections in adjacent relation, a housing enveloping said camera sections, a lens system carried by said housing, and substantially semi-circular key members extending from opposite ends of each of said camera sections and engaging keyways in said housing whereby said camera sections may be revolved within said housing for selectively aligning the light apertures in either of said camera sections with the lens system carried by said housing.

7. A twin camera comprising a pair of longitudinally extending camera sections hingedly connected together at adjacent ends and normally nested back-to-back to form a conjoint structure of substantially circular cross-section, each of said sections including a light sensitive film, a film moving mechanism, a light aperture, light-proofing closure means, a focal plane shutter interposed between said film and said light aperture in each of said camera sections, a housing disposed on an axis coincident with the axis of said camera sections and surrounding both of said sections, and an optical system carried by said housing, the light aperture of either of said sections being selectively alignable with said optical system in said housing by rotatably orienting said camera sections with respect to said housing, the film in each of said sections extending in substantially parallel planes separated from each other in said lightproofing closure means.

8. A camera of the dual type comprising a pair of camera sections hingedly connected at adjacent ends thereof and adapted to be folded or unfolded about a vertical pivot with respect to each other, a film, a film moving mechanism, a shutter, an optical aperture system carried by each of said camera sections, said camera sections when folded adjacent each other having a bell-like contour including enlarged end portions and an intermediate portion of reduced substantially circular section, and a lens housing surrounding said intermediate portion of reduced substantially circular section, the axis of said lens housing being concentric with the axis of said camera sections when said camera sections are folded back-to-back, said lens housing carrying a lens system with which the optical aperture system in either of said camera sections may be selectively aligned, the film in said camera sections extending in spaced planes substantially parallel to each other when said camera sections are folded adjacent each other.

9. A camera of the dual type comprising a pair of camera sections hingedly connected at adjacent ends thereof and adapted to be folded or unfolded about a vertical pivot with respect to each other, and each including a film, a film moving mechanism, a shutter, and an optical aperture system, said camera sections when folded adjacent each other having a bell-like contour including enlarged end portions and an intermediate portion of reduced substantially circular section, a lens housing surrounding said intermediate portion of reduced substantially circular section, the axis of said lens housing being concentric with the axis of said camera sections when said camera sections are folded back-to-back, said lens housing carrying a lens system with which the optical aperture system in either of said camera sections may be selectively aligned, and means extending between said camera sections and said lens housing for maintaining said camera sections in a selected position with respect to said lens housing, the film in said camera sections extending in spaced planes substantially parallel to each other when said camera sections are folded adjacent each other.

10. A camera of the dual type comprising a pair of camera sections hingedly connected at adjacent ends thereof and adapted to be transversely separated with respect to each other or compacted adjacent each other, each of said camera sections including a film, a film moving mechanism, a shutter, and an optical aperture system, said camera sections when compacted adjacent each other having a bell-like contour including enlarged end portions and an intermediate portion of reduced substantially circular section, a lens housing surrounding said intermediate portion of reduced substantially circular section, the axis of said lens housing being concentric with the axis of said camera sections when said camera sections are folded back-to-back, said lens housing carrying a lens system with which the optical aperture system in either of said camera sections may be selectively aligned, means extending between said camera sections and said lens housing for maintaining said camera sections in a selected position with respect to said lens housing when the camera sections are compacted adjacent each other, and a multiplicity of longitudinally extending lightproofing and mechanical latching members extending intermediate the exterior wall of said camera sections and the interior wall of said lens housing for lightproofing and mechanically latching said camera sections in a selected position within said lens housing, the film in said camera sections extending in spaced planes substantially parallel to each other when said camera sections are folded adjacent each other.

11. A twin film camera comprising a pair of longitudinally extending camera sections hingedly connected at adjacent ends, said sections when folded adjacent each other having a bell-like contour with an enlarged substantially hollow chamber at each end thereof and an intermediate connecting portion of reduced section, film moving mechanism arranged in said substantially hollow chambers, a light sensitive film operated by said film moving mechanism from one substantially hollow chamber to the other longitudinally of said intermediate connecting portion of reduced section, a light aperture in said intermediate connecting portion of reduced section, light-proofing means closing each of said camera sections, a housing surrounding said intermediate connecting portion of reduced section, and an optical lens system carried by said housing whereby said camera sections may be rotated within said housing for selectively aligning either of the light apertures therein with said optical lens system.

12. A twin film camera comprising a pair of longitudinally extending camera sections hingedly connected at adjacent ends, said sections when folded adjacent each other having a bell-like contour with an enlarged substantially hollow chamber at each end thereof and an intermediate connecting portion of reduced section, film moving mechanism arranged in said substantially hollow chambers, a light sensitive film operated by said film moving mechanism from one substantially hollow chamber to the other longitudinally of said intermediate connecting portion of reduced section, a light aperture in said intermediate connecting portion of reduced section, light-proofing means closing each of said camera sections, a housing carrying an optical system and comprising a pair of substantially semi-cylindrical sections interconnected one with the other and enveloping the intermediate connecting portions of said camera sections, light-proofing means extending between said camera sections and the sections of said housing whereby said camera sections may be revolved within the sections of said housing for selectively aligning either of the light apertures in said camera sections with the optical system mounted on said housing.

FRED T. RUNDELL.

REFERENCES CITED

The following references are of record in the file of this patent:

UNITED STATES PATENTS

| Number | Name | Date |
|---|---|---|
| 1,330,400 | Sine | Feb. 10, 1920 |
| 2,245,606 | Rauch | June 17, 1941 |
| 2,384,655 | Stewart | Sept. 11, 1945 |
| 2,439,112 | Teague | Apr. 6, 1948 |